United States Patent [19]

Stubenvoll

[11] Patent Number: 4,586,940

[45] Date of Patent: May 6, 1986

[54] PROCESS AND APPARATUS FOR A RECOVERY OF HEAT COMPRISING A HEAT-RECOVERING ABSORPTION OF WATER VAPOR FROM GASES

[75] Inventor: Josef Stubenvoll, Poysdorf, Austria

[73] Assignee: Simmering-Graz-Pauker Aktiengesellschaft, Vienna, Austria

[21] Appl. No.: 655,559

[22] Filed: Sep. 28, 1984

[30] Foreign Application Priority Data

Sep. 29, 1983 [AT] Austria ................................. 3462/83

[51] Int. Cl.⁴ ............................................. B01D 53/14
[52] U.S. Cl. ............................................ 55/32; 55/33; 55/48; 55/50; 55/51; 55/73
[58] Field of Search ............................... 55/31, 33–35, 55/48–51, 73, 29, 30, 32; 423/242, 244

[56] References Cited

U.S. PATENT DOCUMENTS

| | | | |
|---|---|---|---|
| 2,790,505 | 4/1957 | Dow | 55/33 |
| 3,009,684 | 11/1961 | Munters | 55/32 X |
| 3,230,689 | 1/1966 | Hussmann | 55/31 X |
| 3,375,639 | 4/1968 | Miller et al. | 55/48 X |
| 3,538,681 | 11/1970 | Cantrell et al. | 55/48 |
| 3,568,406 | 3/1971 | Dynes | 55/33 |
| 3,674,429 | 7/1972 | Collins | 55/31 X |
| 3,733,777 | 5/1973 | Huntington | 55/48 |
| 3,960,519 | 6/1976 | Ebeling et al. | 55/31 |
| 4,025,322 | 5/1977 | Fisch | 55/48 |
| 4,030,896 | 6/1977 | Wimber et al. | 55/33 |
| 4,181,506 | 1/1980 | Bengtsson | 55/48 |
| 4,184,855 | 1/1980 | Butwell et al. | 55/48 |
| 4,185,969 | 1/1980 | Bulang | 55/33 X |
| 4,248,608 | 2/1981 | Giammarco et al. | 55/48 X |
| 4,294,590 | 10/1981 | Linde et al. | 55/49 X |
| 4,332,596 | 6/1982 | Ranke et al. | 55/48 X |
| 4,378,977 | 4/1983 | Linde et al. | 55/49 X |
| 4,398,927 | 8/1983 | Asher et al. | 55/35 X |

FOREIGN PATENT DOCUMENTS

| | | | |
|---|---|---|---|
| 45210 | 2/1982 | European Pat. Off. | 55/32 |
| 668575 | 11/1938 | Fed. Rep. of Germany . | |

*Primary Examiner*—Robert Spitzer
*Attorney, Agent, or Firm*—Fleit, Jacobson, Cohn & Price

[57] ABSTRACT

Flue gases (6) discharged from a flue gas desulfurizer (5) are fed to an absorption tower (7) and the heat recovered by the absorption is transferred to the flue gases and/or the absorbent (8). The water which has been absorbed by the absorbent is expelled therefrom as vapor by desorption, e.g., by a stripping with flue gas in a preliminary scrubber (44), which precedes the flue gas desulfurizer (5). By means of a pump (16) the absorbent (8) is circulated between the absorption tower (7) and the preliminary scrubber (44). The flue gases (4) discharged from the boiler furnace (1) flow through an air preheater (2), the preliminary scrubber (44), the flue gas desulfurizer (5) and the absorption tower (7), in that order, and are then discharged into the open through a chimney (19). The combustion air (3) is supplied to the boiler furnace (1) through a heat exchanger (45) incorporated in the circulating system for the absorbent (8) and through the air preheater (2).

20 Claims, 10 Drawing Figures

PROCESS AND APPARATUS FOR A RECOVERY OF HEAT COMPRISING A HEAT-RECOVERING ABSORPTION OF WATER VAPOR FROM GASES

SUMMARY OF INVENTION

A heat recovering process and apparatus in which a heatrecovering absorption or adsorption of water vapor from gases and a subsequent desorption are effected. The gases are flue gases delivered by a flue gas treating plant and the heat recovered by the absorption or adsorption is transferred to the flue gases and/or to the absorbent or adsorbent. The water which has been absorbed by the absorbent or adsorbed by the adsorbent is expelled as vapor by a desorbing step.

This invention relates to a heat-recovery process and apparatus comprising a heat-recovering absorption or adsorption of water vapor from gases and a subsequent desorption. The flue gas treating plant may consist, e.g., of a flue gas desulfurizer.

German Patent Specification No. 668,575 discloses a process and apparatus for dehumidifying gases, such as air, by absorption. The heat generated by the absorption is dissipated.

Flue gas desulfurizers comprising scrubbers, spray driers or the like can effect a desulfurization to a high degree of 90% or more, but the flue gases discharged from the desulfurizer are at a temperature of 45° to 65° C. and are saturated or at least enriched with water vapor.

The purified flue gases must be reheated because the gases leaving the chimney must be at a temperature of at least 80° to 100° C., which is legally prescribed in most cases, in order to ensure a favorable spreading of the gases.

It is known to reheat the pure flue gases in that a partial stream of the hot raw gas is branched off before the flue gases enter the flue gas desulfurizer and is admixed to the pure flue gases. But this will undesirably reduce the degree of desulfurization.

Alternatively, a hot flue gas supplied by a burner fired with natural gas or with low-sulfur fuel oil may be admixed to the cooled pure flue gas. The practice involves an additional energy requirement and the operation of such burner involves a formation of instable combustion residues and soot, and the cold and hot gas streams may not be adequately mixed so that the spreading of the gas in the atmosphere is adversely affected. Besides, the volume of the pure gases is increased and the overall efficiency is decreased.

A third alternative resides in the use of a recuperative heat exchanger consisting, e.g. , of a rotary gas preheater, a ceramic heat-storing structure or a conventional heat exchanger, through which a heat transfer fluid flows, for transfer of heat from the hot raw flue gas to the cooled pure flue gas. But a deposition of solids and a clogging resulting from droplets of liquid entrained by the pure flue gas discharged from the flue gas desulfurizer tend to take place in such heat exchangers, and the latter are operated near the acid dew point of the flue gases so that there is a danger of corrosion.

It has also been proposed to supply superheated steam generated by a boiler furnace to a recuperative heat exchanger, but that practice also involves a danger of corrosion and deposition.

It is an object of the invention to provide a new process and a new apparatus for a recovery of heat from water vapor-containing gases, and particularly for reheating pure gases in such manner that the disadvantages of the known processes and apparatus are avoided and additional useful energy can be recovered.

The process of the kind therein described is characterized in that water vapor is absorbed or adsorbed from flue gases discharged from a flue gas treating plant, the heat recovered by the absorption or adsorption is transferred to the flue gases and/or the absorbent or adsorbent, and the water absorbed by the absorbent or adsorbed by the adsorbent is expelled as vapor by desorption.

The water that has been absorbed by the absorbent or adsorbent is expelled as vapor by a reboiling, stripping or flashing step. The absorbent may consist of an aqueous solution of salts, particularly alkali metal halides, such as LiCl, LiI, LiBr, NaCl, NaBr, NaI, KBr, KCl, KI, or e.g., an aqueous solution of nitrates, perchlorates, or an acid aqueous solution of acids of bases, such as alkali metal hydroxides. The adsorbent consists of solids having a physical activity, such as activated carbon, silica gel or molecular sieves.

It will be understood that an absorbent must have a higher boiling point than water if the latter is to be desorbed by reboiling, and that an absorbent must have a lower affinity to water than the stripping fluid if the water is to be desorbed by stripping.

Within the scope of the invention, at least part of the heat required for the desorption may be supplied from a boiler furnace which discharges the flue gases that are to be treated, e.g., said heat may be extracted from the flue gas before it enters an air preheater, or from the combustion air discharged from an air preheater, or from steam generated by the boiler furnace. Also within the scope of the invention, at least part of the heat required for the desorption may consist of waste heat, which may be extracted, e.g., from the steam exhausted by a turbine or from flue gas discharged by an air preheater. Finally, at least part of the heat required for the desorption may be supplied within the scope of the invention as extraneous energy, e.g., by an oil or gas burner, an electric heater, extraneous steam or ambient heat, and may be recovered in the latter case by a heat pump, if desired.

In accordance with the invention the water vapor formed by the desorption is supplied to the boiler furnace system and is used therein to preheat the combustion air or the feed water to be supplied to the boiler furnace. Alternatively, that water vapor may be supplied to a flue gas treating plant which succeeds the boiler furnace and may be used in such plant to heat the flue gases to be discharged through a chimney, or to supply process heat to the flue gas treating plant. Said water vapor may alternatively be supplied to an external heat consumer for heating purposes or may be caused to deliver its heat to air or cooling water. In all cases the delivery of heat from the water vapor will cause the latter to condense and the aqueous condensate is supplied to the flue gas treating plant.

Within the scope of the invention, the heat recovered by the absorption or adsorption is supplied to the boiler furnace system and is used therein to preheat the combustion air or the boiler feed water, or said heat is transferred to a heat transfer fluid for extraneous use. This is desirably effected by a heat exchange between the combustion air and/or the feed water and/or the heat transfer fluid, on the one hand, and the absorbent or adsorbent before the absorption or adsorption, or a mixture of flue gas and absorbent or adsorbent, or the flue gas after the absorption or adsorption.

The water might also be removed from the flue gas by condensation and in that case the primary heat transfer fluid may consist of a refrigerant, or the primary heat transfer fluid may transfer heat to a refrigerant. The heat extracted by the refrigerant may be delivered to a fluid, e.g. by a heat pump process which is supplied with additional energy, which is also transferred to said fluid. The heat content of the fluid is supplied to the boiler furnace system; in that case the fluid is either the combustion air to be preheated or the boiler feed water to be reheated. Alternatively, the fluid may be used to preheat the combustion air or the boiler feed water to be supplied to the boiler furnace. Alternatively, the heat content of the fluid may be supplied to the flue gas treating plant succeeding the boiler furnace; in the latter case the fluid may consist of the flue gas to be reheated before it is discharged through a chimney, or the heat content of the fluid may be supplied as process heat to the flue gas treating plant. Finally, the heat content of the fluid may be supplied to an external heat consumer for heating purposes. The aqueous condensate which becomes available may be used in a flue gas treating plant. If water is separated by condensation, a pressure reduction is effected by the application of a vacuum and the vapor expelled by the desorption is condensed by an extraneous cooling and the aqueous condensate is recycled to the flue gas treating plant.

Before the desorption, a heat exchange may be effected between the low-water absorbent and the absorbent which is enriched with water.

The process is mainly intended for use in conjunction with combustion plants but may also be used in plants for treating exhaust gases, e.g., of internal combustion engines, in stripping plants using water vapor as a stripping gas, in vulcanizing plants, etc.

Apparatus for carrying out the process in accordance with the invention is characterized in that an absorber consisting of an absorption tower and a desorber consisting of a reboiler are provided and the absorbent is circulated by at least one pump through the absorption tower and the reboiler.

Within the scope of the invention, a heat exchanger is incorporated in the system for circulating the absorbent through the absorption tower and the reboiler. The absorption tower is desirably connected between a flue gas treating plant and a chimney; said flue gas treating plant may consist of a flue gas desulfurizer.

A second embodiment of apparatus for carrying out the process in accordance with the invention comprises an absorber consisting of an absorption tower, a desorber consisting of a preliminary scrubber, which precedes the flue gas treating plant, and at least one pump for circulating the absorbent through the absorption tower and the preliminary scrubber. In accordance with a further feature of that variant, a heat exchanger consisting preferably of an air preheater is incorporated in the system for circulating the absorbent through the absorption tower and the preliminary scrubber.

The invention will now be explained with reference to the drawings, which show preferred illustrative embodiments.

Figure 1:
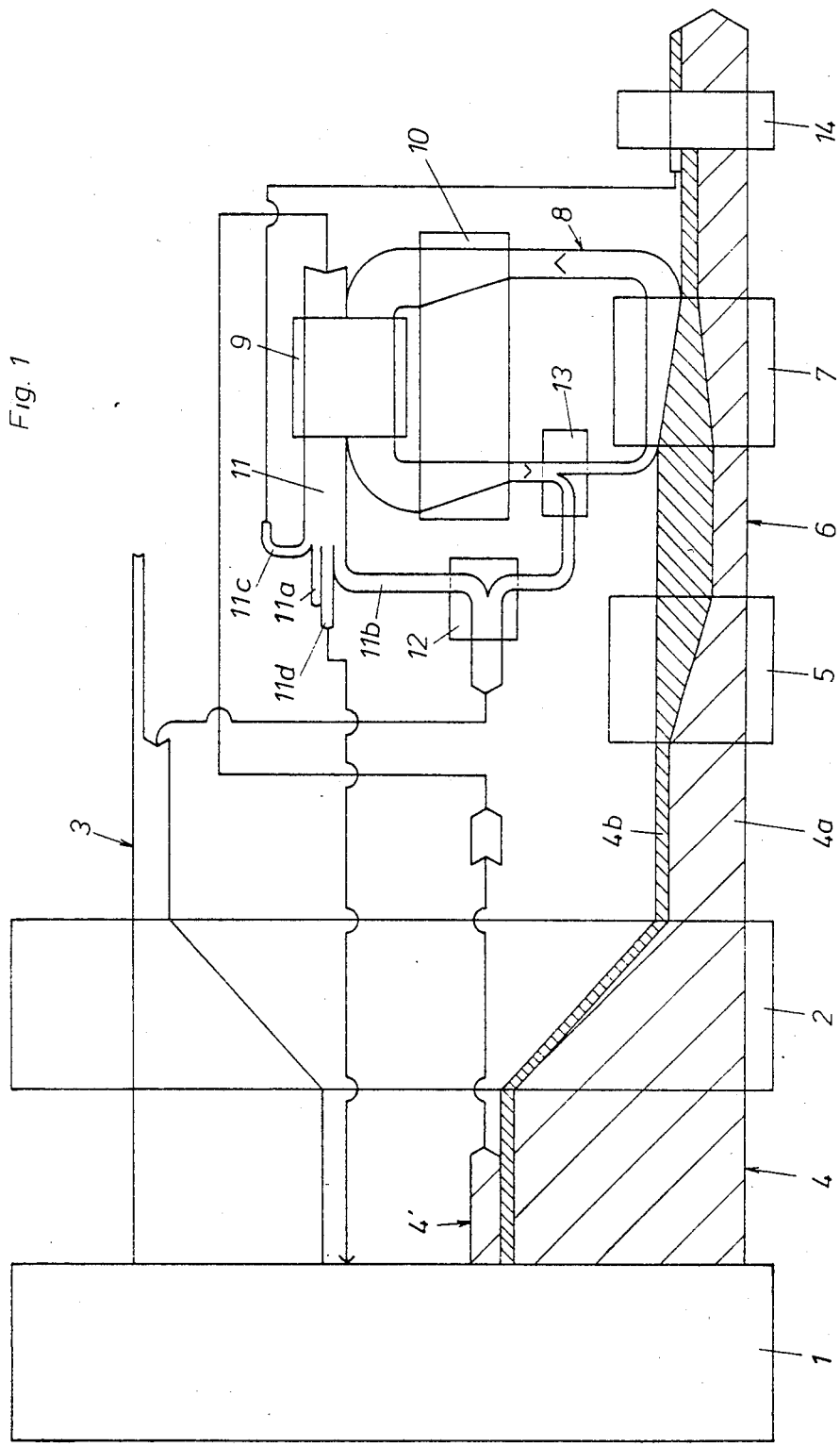
FIG. 1 is a heat flow diagram for facilitating the understanding of the invention.

The heat flow diagram shown in FIG. 1 illustrates a boiler furnace 1 of a heating system. That boiler furnace is preceded by an air preheater 2 of known type, in which combustion air 3 is heated by the hot flue gases 4 discharged from the boiler furnace. The raw flue gases entering the air preheater 2 are at a temperature of, e.g., 350° C. The raw flue gases leaving the air preheater 2 are at a temperature of about 130° C. and have a water vapor content of about 7 vol. %. In conventional systems the heat content of the raw flue gas 4 leaving the air preheater 2 is lost. The heat content consists substantially of two parts, namely, the heat content 4a of the dry gas (represented by the coarsely hatched area) and the latent heat of evaporation 4b of the water vapor content (illustrated by the closely hatched area). From that aspect the air preheater 2 is regarded as a part of the boiler furnace system and is succeeded by the flue gas desulfurizer 5, which consists of a scrubber, spray dryer or the like and in which the temperature of the flue gas is reduced by an addition of water to the flue gas stream. As a result, the original heat content 4a of the dry flue gas is reduced, whereas its water vapor content and latent heat of evaporation 4b are increased.

The flue gas desulfurizer 5 is succeeded by apparatus provided in accordance with the invention for reheating the cooled pure flue gases 6. In the present embodiment that apparatus consists of an absorber, specifically of an absorption tower 7. The absorption tower 7 contains an absorbent 8, which absorbs part of the water vapor content of the pure flue gases. The absorption results in a recovery of heat, by which the temperature of the pure gases in the absorption tower 7 is raised. Additional heat is transferred to the absorbent 8, which is circulated through the absorption tower 7 and through a desorber, which consists, e.g., of a reboiler 9. Additional heat can be transferred to a fluid consisting, e.g., of the combustion air or the boiler feed water for the boiler furnace or of other fluids for use in consumers of low-temperature heat, such as heat pumps. In the reboiler 9 the water which has been absorbed by the absorbent 8 is expelled, i.e., evaporated. The heat required for that purpose is extracted from hot flue gases 4' which have been branched off from the hot flue gases 4 discharged from the boiler furnace 1. Additional heat for desorption may be supplied, e.g. by a recovery of latent heat of solution as the water is evaporated in the reboiler 9 so that less heat is required for the desorption than would be required to evaporate the same quantity of pure water. Alternatively, the heat required for desorption may be extracted from a branch stream of the hot combustion air leaving the air preheater 2, or from an air stream discharged by a separate gas heater, it may be supplied by a steam supply system or another heat source. The requirement for additional heat energy can be decreased in that an internal heat exchanger 10 is incorporated in the system for circulating the absorbent through the absorption tower 7 and the reboiler 9.

The heat content 11 of the steam discharged from the reboiler 9 may be used for various purposes. A part 11a of said steam may be used, e.g., as useful heat for room-heating purposes or as process heat. Another part 11b may be used in a heat exchanger 12 to heat the combustion air 3. By means of an additional heat exchanger 13, the heat exchanger 12 may be supplied with the remaining surplus heat of solution of the absorbent 8. The heat transferred in the heat exchanger 12 to the combustion air 3 compensates the heat which has been extracted from the hot raw gases in the branched-off part 4' thereof.

Another part 11c of the heat content 11 of the steam may be supplied to a heat exchanger 14, which is downstream of the absorption tower 14 and will be used if the pure gases must be heated further before they enter the chimney. A further part 11d of the heat content 11 of the steam may be used to preheat the boiler feed water for the boiler furnace 1.

It is apparent that the process in accordance with the invention affords the following essential advantages:
1. Useful energy is recovered in the form of low-pressure steam and/or preheated air.
2. No additional impurities enter the pure flue gas.
3. The volume of the pure flue gas stream is reduced.
4. There is no need to conduct the flue gas through a heat exchanger operated near the dew point of acid.
5. Heat is preferably directly transferred in the absorber and/or desorber.
6. The condensate formed by the vapor that has been expelled in the reboiler 9 may be injected into the flue gases in the flue gas desulfurizer 5.

In the block diagrams shown as FIGS. 2 to 10, the conduits for conducting raw or pure flue gas are represented by thick solid lines, the conduits for conducting combustion air are represented by dash-dot lines, the conduits for conducting absorbent or condensate are represented by thin solid lines, and the conduits for conducting water vapor are represented by dotted lines. Like parts of the plant are represented by the same reference characters.

Such parts of the plant are the absorber, the desorber, heat exchangers, pumps, blowers, pipe fittings, condensate traps, etc.

The absorber consists preferably of a contacting apparatus, e.g., in the form of a plate column provided, e.g., with sieve plates, bubble cap plates, valve plates, tunnel plates, grate plates or the like, or of a trickling flow absorber, spray absorber, packed column of thick-film absorber.

The desorber consists preferably of a heat exchanger, which may be succeeded, e.g., by plate columns, trickling flow towers, thick-film desorbers, spray towers, packed columns.

The absorbers and desorbers of the kinds mentioned above may be combined as desired. Preferred combinations are shown in FIGS. 2 to 10.

The following desorption methods may be used:
1. Reboiling Desorption is effected by heating the absorbent.
2. Stripping Desorption is effected in that the partial pressure of the water vapor disposed over the absorbent is decreased by an admixing of inert gases, such as hot air, dry flue gases etc.
3. Flashing Desorption is effected by a pressure drop above the absorbent, e.g., by means of a vacuum pump or a condenser.

Figure 2:
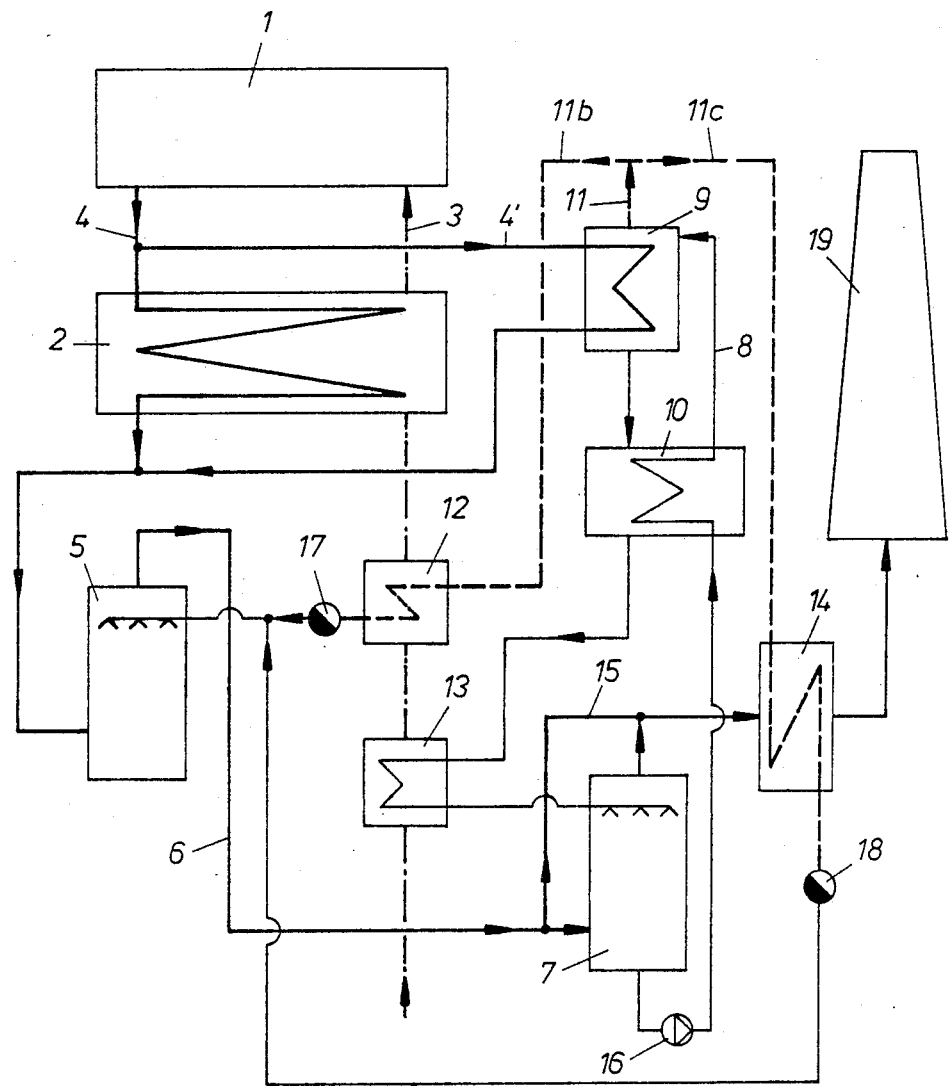
FIGS. 2 to 10 are block diagrams of preferred embodiments of plants used in accordance with the invention to reheat pure gases.

A first embodiment of a plant for reheating pure flue gases discharged from the flue gas desulfurizer is shown in FIG. 2 in a block diagram. That embodiment is particularly suitable for electric power plants. e.g., 90% vol. % of the hot flue gases 4 discharged from the boiler furnace 1 are supplied to the air preheater 2 and 10 vol. % of said flue gases are supplied as a branch stream 4' to the reboiler 9 for heating the absorbent 8 and are subsequently admixed to the raw flue gas stream discharged from the air preheater 2. As a result, the entire raw flue gas volume is supplied to the flue gas desulfurizer 5. In this embodiment and in the embodiments illustrated in FIGS. 3 to 9, a dust-collecting electrostatic prepicipitator, not shown, may be connected between the air preheater 2 and the flue gas desulfurizer 5 or between the boiler furnace 1 and the air preheater 2. For instance, 65 vol.% of the cooled pure flue gases discharged from the flue gas desulfurizer 5 are supplied to the absorption tower 7. The remaining 35 vol. % of said pure flue gases are conducted in a by-pass line 15 and admixed to the reheated pure flue gases discharged from the absorption tower 7.

A partial stream 11b of the low-pressure steam 11 produced in the reboiler 9 is supplied to a heat exchanger 12, which precedes the air preheater 2. Another branch stream 11c of that steam is supplied to a heat exchanger 14, which is connected to the outlet of the absorption tower 7 and serves to further reheat the pure flue gases. The closed system for circulating the absorbent 8 incorporates a pump 16, which is connected to the absorbent outlet of the absorption tower 7 and pumps the absorbent, that has been enriched with water, through the internal heat exchanger 10 into the reboiler 9. Low-water context absorbent flows from the reboiler 9 through the internal heat exchanger 10 to a heat exchanger 13, which serves to preheat the combustion air 3. The low-water context absorbent is then returned to the absorption tower 7. In the heat exchanger 12 downstream of the heat exchanger 13, the combustion air 3 is heated further before entering the air preheater 2, in which the combustion air 3 is heated to the desired end temperature. A condensate trap 17 is connected to the outlet of the primary flow path of the heat exchanger 12. Another condensate trap 18 is provided at the outlet of the primary circuit of the heat exchanger 14. The aqueous condensate collected in both condensate traps 17 and 18 is supplied to the flue gas desulfurizer 5. The reheated flue gases 6 discharged from the heat exchanger 14 enter the atmosphere through the chimney 19.

Figure 3:
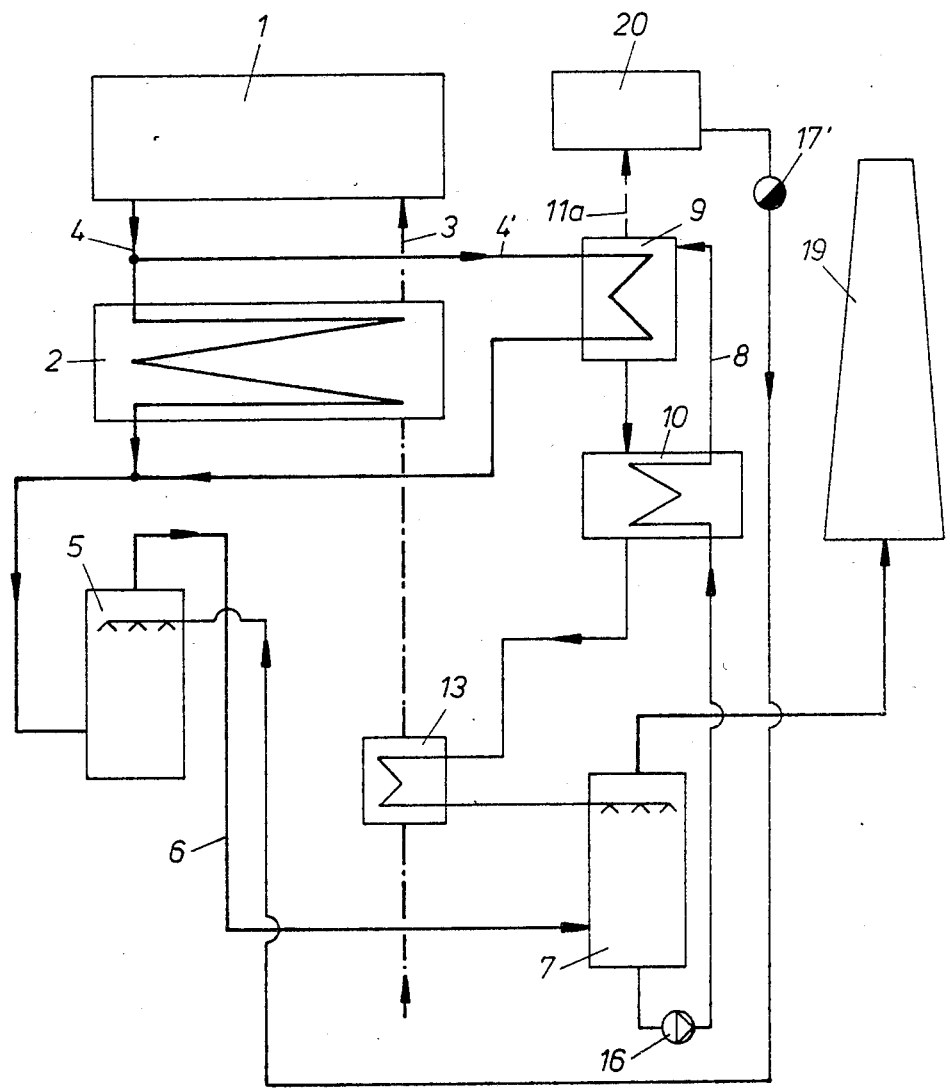

A second embodiment of a plant for reheating the cooled pure gases is represented by the block diagram of FIG. 3. That plant is particularly suitable for use in a plant for supplying heat and electric power. A large quantity of useful heat 11a becomes available as low-pressure steam. In the embodiment shown in FIG. 3, e.g., about 30 vol. % of the raw flue gases 4 discharged from the boiler furnace are supplied as a branch stream 4' to the reboiler 9 and the remaining 70 vol. % of said gases are supplied to the air preheater 2. The heat exchangers 12 and 14 and the by-pass conduit 15 shown in FIG. 2 are omitted in the embodiment of FIG. 3. The entire quantity of steam 11a leaving the reboiler 9 is supplied to a consumer 20 of low-pressure steam. Condensate formed in that consumer 20 is collected in a condensate trap 17' and subsequently recycled to and sprayed into the flue gas desulfurizer 5. In other respects the design and connections are the same as in the embodiment shown in FIG. 2 and need not be described in detail. Instead of the hot raw flue gases 4', an extraneous heat source consisting of low-pressure steam, flue gas or electric power may be used to heat the reboiler 9 in FIG. 3.

Figure 4:
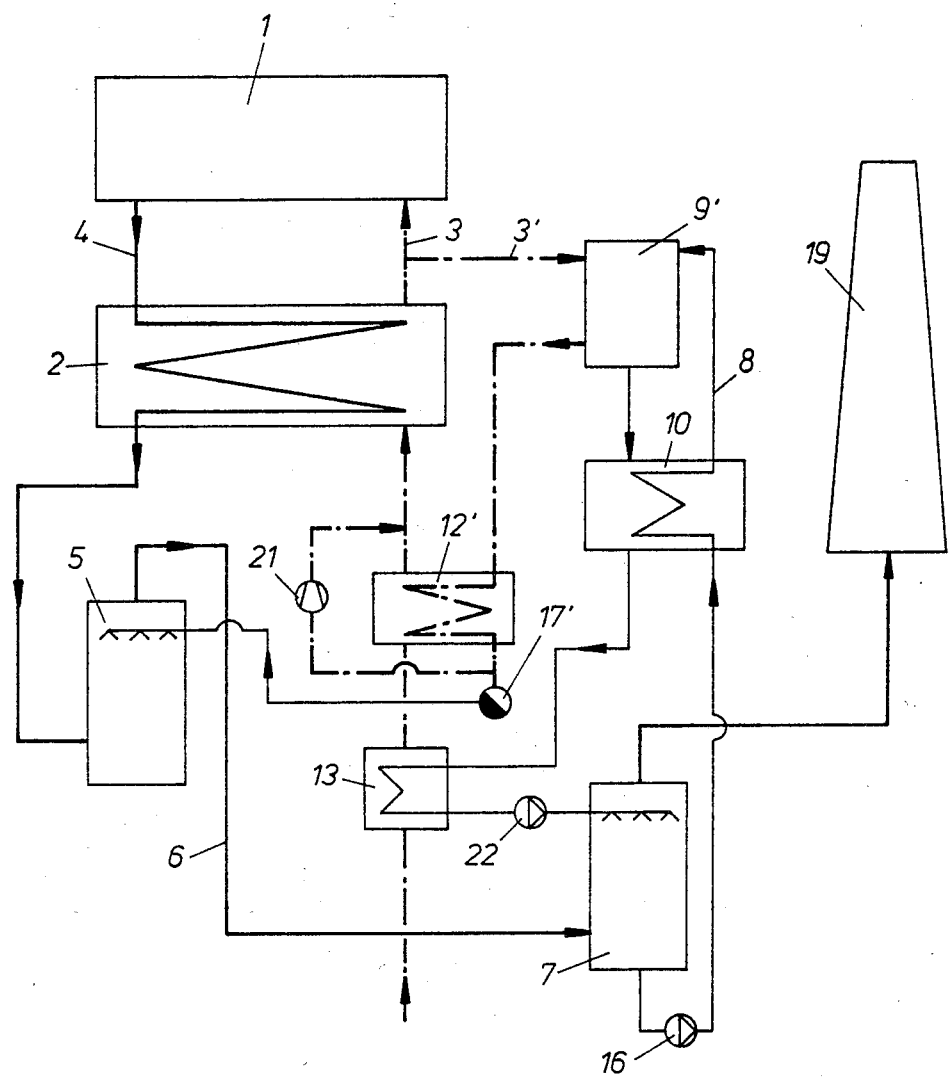

The third embodiment of the invention, shown in FIG. 4, is also used to advantage in electric power plants. In this embodiment all raw flue gases discharged from the boiler furnace 1 are supplied to the air preheater 2. The desorber 9' is supplied with a branch stream of hot air 3' which has been branched from the combustion air stream 3. The mixture of hot air and steam discharged from the desorber 9' is delivered to the heat exchanger 12' and is used therein to reheat the combustion air 3, which has been preheated earlier in the heat exchanger 13. A condensate trap 17' is connected to the outlet of the primary flow path of the heat exchanger 12'. The remaining hot air is fed by a blower 21 to the line for conducting combustion air from the heat exchanger 12' to the air preheater 2.

The raw flue gases discharged from the air preheater 2 are supplied to the flue gas desulfurizer 5, from which pure flue gases are supplied to the absorption tower 7. From the latter, reheated pure flue gases enter the chimney 19.

The system for circulating the absorbent is the same as that shown in FIGS. 2 and 3, with the difference that an additional pump 22 is incorporated in the line between the absorption tower 7 and the internal heat exchanger 10.

Whereas desorption is effected by reboiling in the processes represented in FIGS. 2 and 3, the process illustrated in FIG. 4 comprises a desorption effected by heating and stripping. The stripping gas consists of hot air supplied to the desorber 9' or may consists of any other inert gas. The water vapor contained in the hot air that is discharged from the desorber 9' condenses in the heat exchanger 12' and the resulting condensate is collected in the condensate trap 17' and supplied to the flue gas desulfurizer 5.

Figure 5:
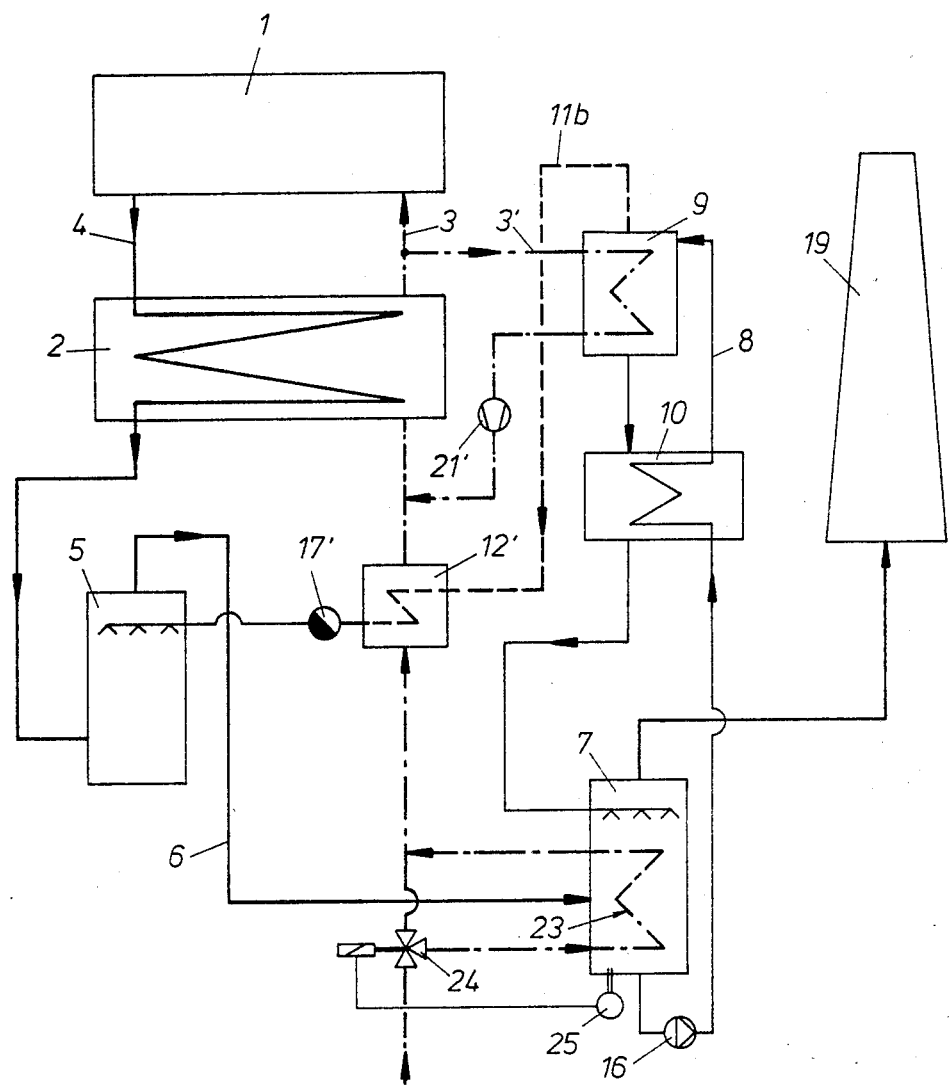

The fourth embodiment shown in FIG. 5 can also be used in electric power plants. In this embodiment the reboiler 9 is heated by a stream of combustion air 3' which is branched from the stream of combustion air 3 before the latter enters the boiler furnace 1. The stream 3' is passed through the reboiler 9 and by a blower 21' it is recycled to the line that connects the heat exchanger 12' to the air preheater 2. The low-pressure steam 11b produced in the reboiler 9 is supplied to the air-preheating heat exchanger 12'. The condensate is collected in the condensate trap 17' and supplied to the flue gas desulfurizer 5.

In this embodiment the absorption tower 7 is cooled by a heat exchanger 23, which is integrated in the absorption tower 7 and used to preheat the combustion air. A controlled three-way valve 24 is provided, from which the cold combustion air can be selectively supplied to the heat exchanger 23 or directly to the heat exchanger 12'. The three-way valve 24 is controlled by a thermostat 25, which is disposed in the absorption tower 7.

Figure 6:
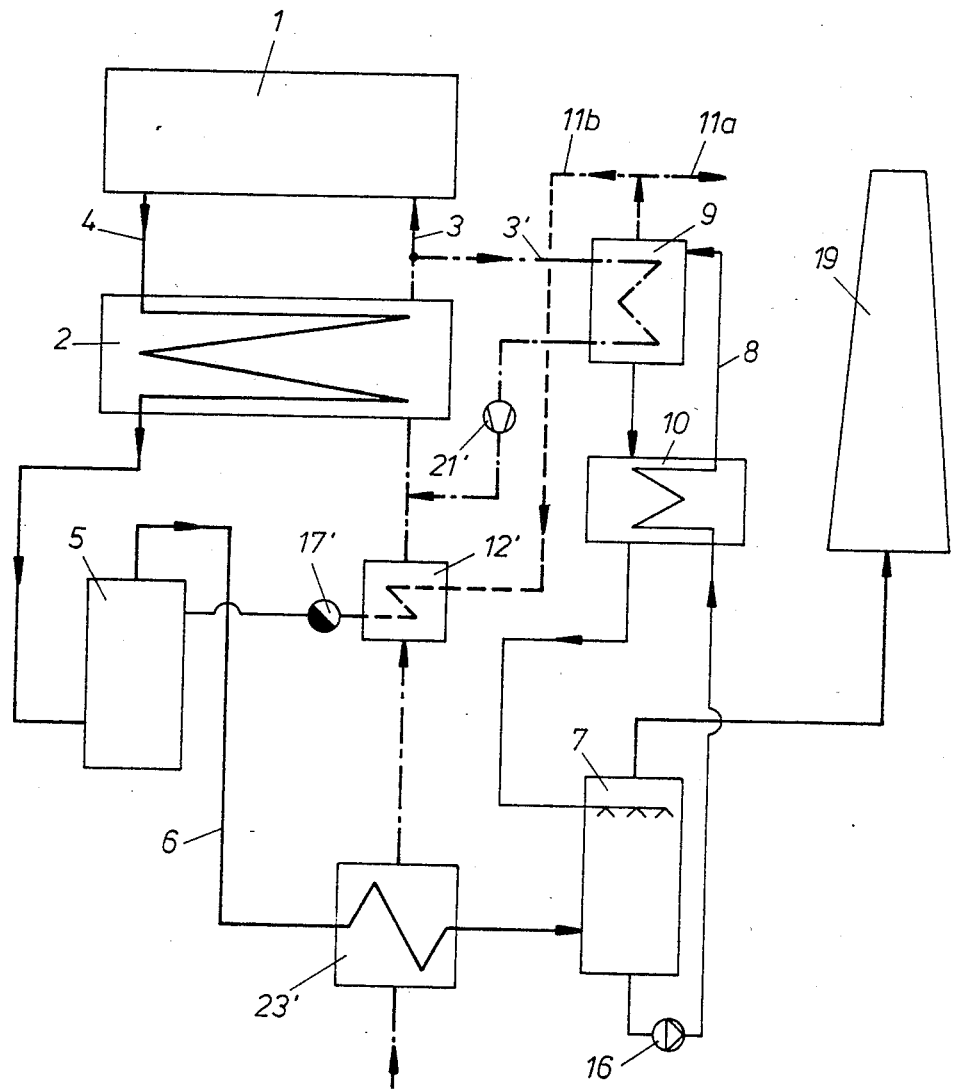

The fifth embodiment shown in FIG. 6 is almost identical to the embodiment of FIG. 5, with the difference that the integrated heat exchanger 23 has been replaced by a separate heat exchanger 23', in which the pure flue gases 6 are cooled before entering the absorption tower 7, in order to increase the absorption rate, and the combustion air is preheated. A partial stream 11b of the low-pressure steam produced in the reboiler 9 is supplied to the heat exchanger 12' for reheating the combustion air and a second partial stream 11a of said steam is used as useful steam.

Figure 7:
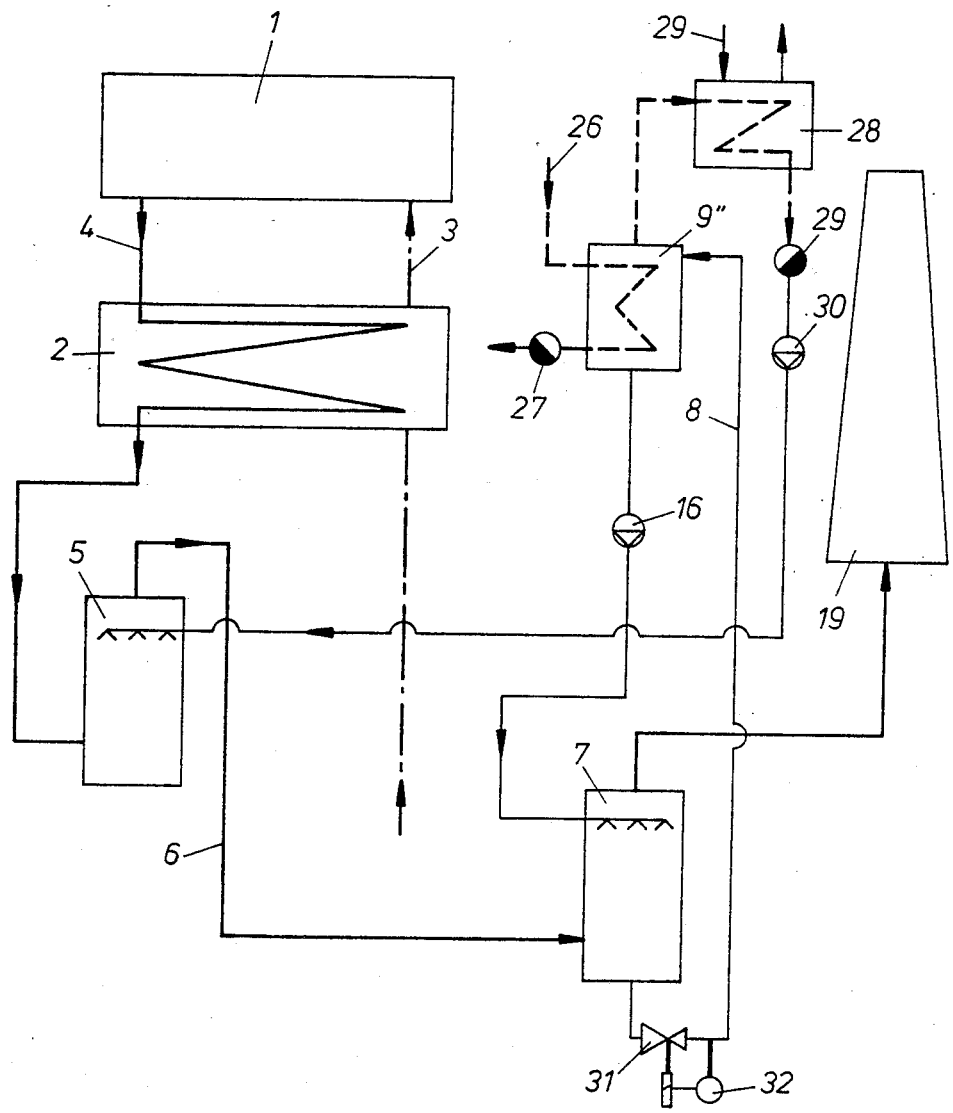

The sixth embodiment shown in FIG. 7 is particularly suitable for use in electric power plants. In this embodiment the combustion air is heated only by the air preheater 2 and the entire heat released in the absorption tower 7 is delivered to the pure flue gases 6. The desorber 9" is heated by extraneous heat, e.g., by the exhaust steam 26 from a steam turbine. Condensate contained in the steam discharged from the desorber 9" is collected in a condensate trap 27 and supplied as boiler feed water to the boiler furnace 1. In the desorber 9"', desorption is effected by a pressure drop in the space above the absorbent (heat transformer principle). The vacuum is produced, e.g., by a condenser 28, which is connected to the desorber 9"' and supplied with cooling water 29. The condensate discharged from the condenser 28 is collected in a condensate trap 29 and is recycled by a pump 30 to the flue gas desulfurizer 5. A controllable expansion valve 31 is connected to the absorbent outlet of the absorption tower 7 and is controlled by a pressure sensor 32 in dependence on the pressure in the line for supplying absorbent to the desorber 9"'. When the (absolute) pressure is excessively high, the valve 31 is closed to prevent a flow of absorbent 8 to the desorber 9"'. When the pressure then drops to a predetermined value, the valve 31 is opened so that the flow of absorbent 8 to the desorber 9"' is resumed.

Figure 8:
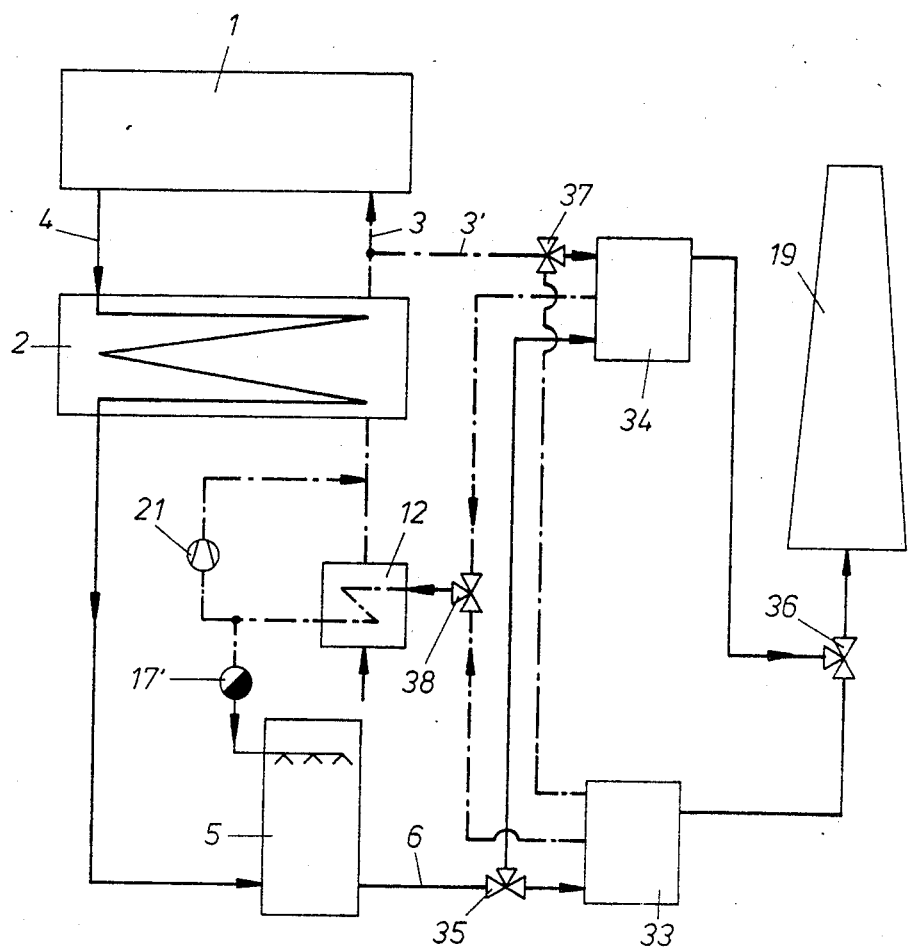

The seventh embodiment shown in FIG. 8 can also be used in electric power plants. In this embodiment water vapor is removed from the flue gases by adsorption. The adsorbent used for this purpose is contained in two reactors 33 and 34. The pure flue gases 6 discharged from the flue gas desulfurizer 5 are passed through a three-way valve 35 to either of the two reactors 33 and 34. The pure flue gas outlets of the two reactors 33 and 34 are connected to another three-way valve 36, from which the pure flue gases flow to the chimney 19. The two three-way valves are controlled in such a manner that adsorption takes place only in one of the reactors 33 and 34 at a time and the adsorbent in the other reactor is regenerated by being stripped with hot air. Each reactor is periodically changed over between the absorption and desorption modes. The hot air 3' required for the desorption is branched off from the combustion air 3 which has been heated in the air preheater 2. The hot air 3' is passed through a three-way valve 37 to one of the two reactors 33 and 34. The hot air outlets of the two reactors 33 and 34 are connected to another three-way valve 38, from which the hot air is conducted to the heat exchanger 12, in which the water vapor taken up by the air during the desorption in the reactor 33 or 34 condenses. The condensate is collected in a condensate trap 17' and is supplied to the flue gas desulfurizer 5. The dry hot air is fed by a blower 21 into the line for conducting combustion air to the air preheater 2.

The three-way valves 35 and 36, on the one hand, and the three-way valves 37 and 38, on the other hand, are operated in synchronism.

The two reactors 33 and 34 may be connected, e.g., by bucket elevators for handling adsorbent. In that case the reactor 33 may be used only as an adsorber and the reactor 34 only as a desorber so that the three-way valves 35, 36, 37 and 38 can be omitted.

Instead of hot air, an inert gas may be used to regenerate the adsorbent.

Figure 9:
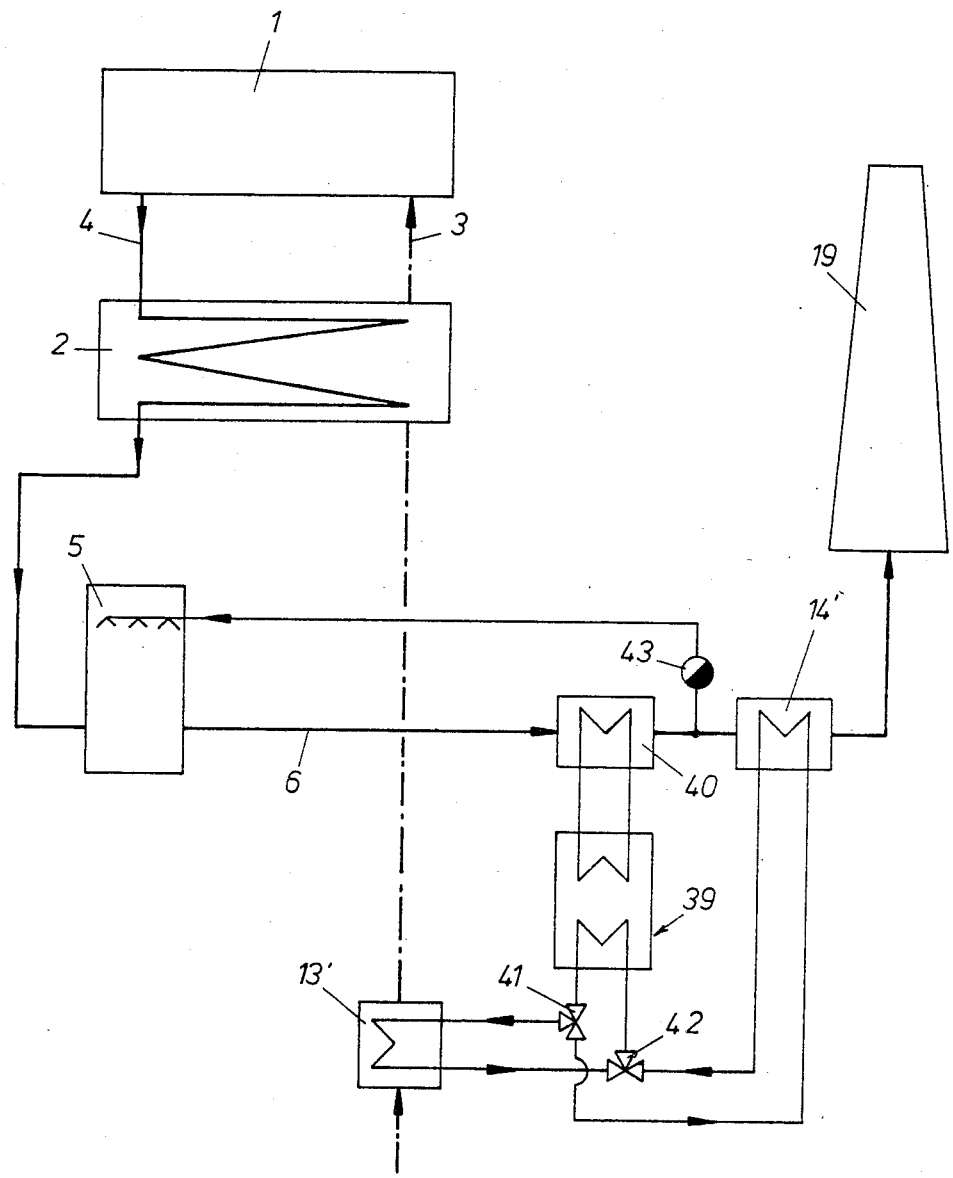

In the eigth embodiment shown in FIG. 9, the flue gases are cooled to effect a condensation of their water vapor content. A heat pump 39 is used for that purpose and comprises an evaporator 40, which is flown through by and used to cool the pure flue gases 6 discharged from the flue gas desulfurizer 5. The heat transfer fluid which has been heated in the condenser of the heat pump 39 consists, e.g., of water and may be used to preheat the combustion air 3 and/or to reheat the pure flue gases before they enter the chimney 19. In this embodiment the heating fluid outlet of the heat pump 39 is connected to a pair of three-way valves 41, 42, which can be selectively operated to supply the heating fluid to an air-heating heat exchanger 13' and/or to a heat exchanger 14' for reheating the pure gases. Condensate entrained by the vapor discharged from the evaporator 40 is collected in a condensate trap 43 and is subsequently supplied to the flue gas desulfurizer 5.

The additional energy required for the operation of the heat pump 39 must be supplied from an extraneous source.

Figure 10:
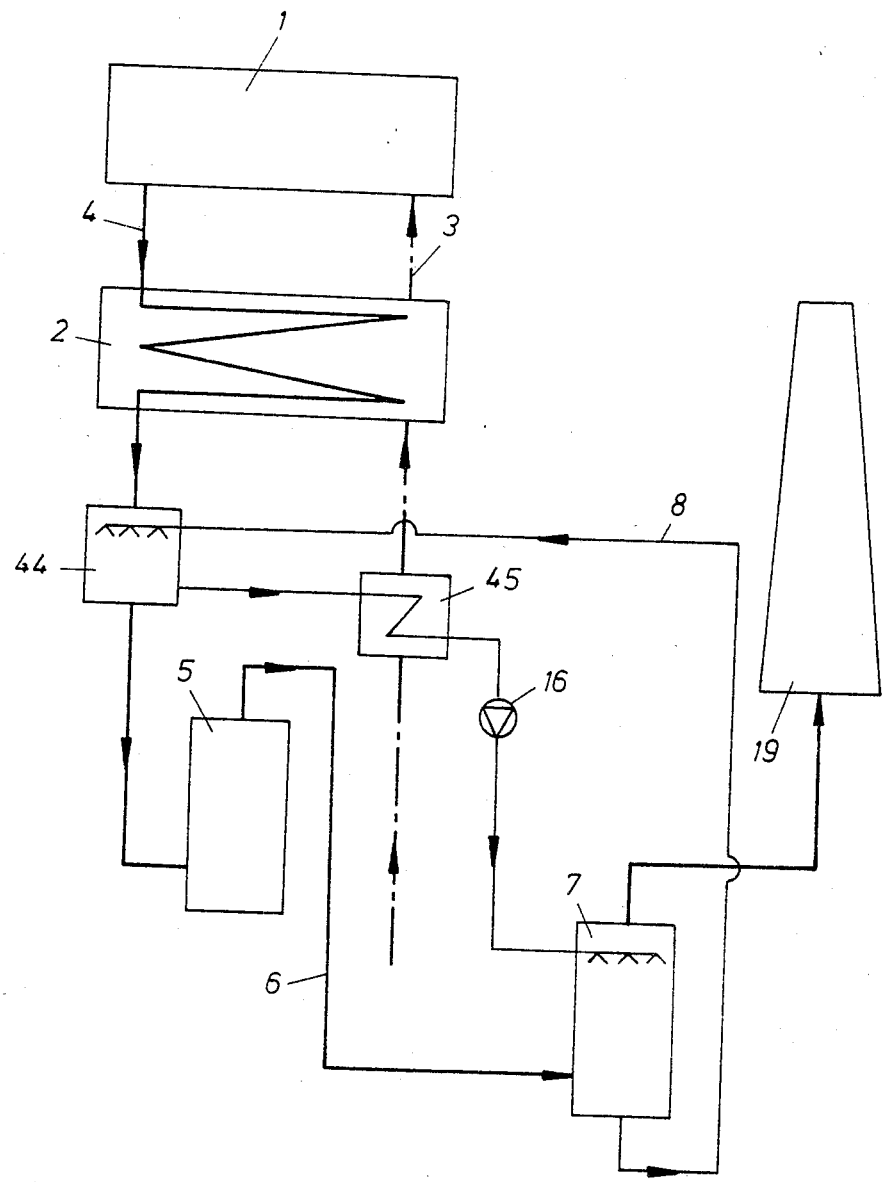

The ninth embodiment shown in FIG. 10 is similar to that of FIG. 7 with the difference that desorption is effected by stripping with flue gas in a preliminary scrubber 44, which is connected between the air preheater 2 and the flue gas desulfurizer 5.

Just as in the preliminary scrubber associated with a conventional flue gas desulfurizer, the preliminary scrubber 44 effects saturation of the flue gases with water vapor and a preliminary removal of HC1, and also effects collection of dust if no electrostatic precipitator is provided. The circulating absorbent 8 consists preferably of a $CaCl_2$ solution, which can be regarded as being non-polluting. Because the solution has a low pH value of 1 to 2, a selective absorption of HCl is effected in the preliminary scrubber 44. $SO_2$ would be absorbed by the solution only at a higher pH value of 3 to 7 so that $SO_2$ will not be absorbed by the absorbent 8 but will pass through the preliminary scrubber 44. A pump 16 is used to circulate the absorbent through the desorber, used as a preliminary scrubber 44, and the absorption tower 7.

For a recovery of net energy, as desired, an air-preheating heat exchanger 45 may be incorporated in the system in which the absorbent 8 is circulated through the preliminary scrubber 44 and the absorption tower 7. The heat exchanger 45 may consist of a direct heat exchanger, in which the absorbent is directed contacted with the air.

The desorption in the preliminary scrubber 44 results in the following advantages:
1. The structure is simplified because the desorption and preliminary scrubbing are effected in a single unit.
2. The water consumption is reduced because the water vapor expelled from the absorbent serves to saturate the flue gases.
3. CaO, $Ca(OH)_2$ or $CaCO_3$ may be added to the absorbent in order to effect neutralization of the HC1 by reacting with the HC1 to form $CaCl_2$.
4. The preliminary scrubber 44 may be integrated in the flue gas desulfurizer as the first scrubbing stage so that the structure will be further simplified.

The absorption tower 7 may also be integrated in the flue gas desulfurizer as the last scrubbing stage so that an even more compact structure is obtained. In the embodiments shown in FIGS. 2 to 7 the absorption tower may also be incorporated in the flue gas desulfurizer.

What I claim is:

1. A process for recovering heat from flue gases discharged from a flue gas treating plant, said process comprising:
   (a) removing water vapor from the flue gases;
   (b) recovering heat from the removed water vapor;
   (c) transferring part of the recovered heat to the flue gases that remain after the water vapor removal step to reheat said gases and maintain said gases at a desired temperature; and
   (d) transferring the remainder of the recovered heat to at least one fluid for subsequent transfer to a fluid employed in a separate heating process.

2. A process according to claim 1, wherein said water removal step includes absorption of water by passing the flue gases through an absorption tower containing a liquid absorbent.

3. A process according to claim 2, including the steps of transferring part of the recovered heat to the liquid absorbent, and expelling water from the absorbent as water vapor by desorption heating.

4. A process according to claim 3 including supplying part of the heat required for desorption from a combustion air that has been preheated in an air preheater for supply to a boiler furnace from which the flue gases originate.

5. A process according to claim 3 including supplying part of the heat required for desorption from steam generated by a boiler furnace from which the flue gases originate.

6. A process according to claim 3 including supplying part of the heat required for desorption from flue gas discharged from an air preheater that is heated with flue gas.

7. A process according to claim 3 including supplying part of the heat required for desorption from flue gas from an oil or gas burner.

8. A process according to claim 3 including supplying part of the heat required for desorption from an electric heater.

9. A process according to claim 3 including supplying part of the heat required for desorption from an external source of steam.

10. A process according to claim 3 including supplying part of the heat required for desorption from a heat pump.

11. A process according to claim 3, including the step of supplying heat contained in the water vapor formed by the desorption to a boiler furnace for producing said flue gases and using said water vapor to preheat boiler feed water to be supplied to a boiler furnace.

12. A process according to claim 3, including the step of supplying heat contained in the water vapor formed by the desorption to a boiler furnace for producing said flue gases and using said water vapor to supply process heat to treat the flue gases.

13. A process according to claim 3, wherein part of the heat which is recovered by said desorption is used to preheat combustion air or boiler feed water to be supplied to a boiler furnace for producing said flue gases.

14. A process according to claim 3, including supplying part of the heat required for desorption from a boiler furnace delivering the flue gases to be treated by selectively extracting heat from the flue gas before it is supplied to an air preheater.

15. A process according to claim 3, including supplying part of the heat required for desorption by exhaust steam discharged from a turbine.

16. A process according to claim 3, including the step of supplying heat contained in the water vapor formed by the desorption to a boiler furnace for producing said flue gases and using said water vapor to preheat combustion air to be supplied to said boiler furnace.

17. A process according to claim 16, wherein the condensate formed from the water vapor as a result of the extraction of heat therefrom is supplied to a flue gas desulfurizer for treating said flue gases.

18. A process according to claim 11, wherein said water removal step includes absorption of water by passing the flue gases over a solid adsorbent.

19. A process according to claim 18, including the steps of transferring part of the recovered heat to the solid adsorbent, and expelling water from the adsorbent as water vapor by desorption heating.

20. A process according to claim 2, wherein part of the heat which is recovered by said absorption is used to preheat combustion air or boiler feed water to be supplied to a boiler furnace for producing said flue gases.

* * * * *